(12) United States Patent
Kearns

(10) Patent No.: US 7,403,082 B2
(45) Date of Patent: Jul. 22, 2008

(54) DUAL MODE ANTENNA SWITCH MODULE

(75) Inventor: Brian Kearns, Dublin (IE)

(73) Assignee: TDK Corporation, Tokyo (JP)

( * ) Notice: Subject to any disclaimer, the term of this patent is extended or adjusted under 35 U.S.C. 154(b) by 205 days.

(21) Appl. No.: 11/362,834

(22) Filed: Feb. 28, 2006

(65) Prior Publication Data

US 2006/0192631 A1    Aug. 31, 2006

(30) Foreign Application Priority Data

Feb. 28, 2005   (EP) .................................. 05394007

(51) Int. Cl.
  *H01P 5/12*   (2006.01)
  *H01P 1/10*   (2006.01)
  *H03H 7/46*   (2006.01)
(52) U.S. Cl. ........................ 333/126; 333/101; 333/129; 333/132; 455/83
(58) Field of Classification Search ................. 333/101, 333/126, 129, 132; 455/83, 562.1
See application file for complete search history.

(56) References Cited

U.S. PATENT DOCUMENTS

| 2002/0090974 | A1 | 7/2002 | Hagn |
| 2002/0183016 | A1 | 12/2002 | Kemmochi et al. |
| 2004/0048634 | A1 | 3/2004 | Satoh et al. |
| 2004/0132487 | A1 | 7/2004 | Kearns |
| 2004/0239442 | A1 | 12/2004 | Wilcox |
| 2004/0266378 | A1 | 12/2004 | Fukamachi et al. |
| 2006/0189277 | A1* | 8/2006 | Ranta et al. .................... 455/78 |

FOREIGN PATENT DOCUMENTS

| EP | 1 168 650 A | 1/2002 |
| EP | 1 427 115 A | 6/2004 |
| EP | 1 418 680 A1 | 5/2005 |

* cited by examiner

*Primary Examiner*—Robert J. Pascal
*Assistant Examiner*—Kimberly E Glenn
(74) *Attorney, Agent, or Firm*—Oliff & Berridge, PLC

(57) ABSTRACT

A dual mode antenna switch module (ASM) comprises a UMTS TX port; a UMTS RX port; and a UMTS duplexer, comprising a common port, a TX port coupled to the UMTS TX port and an RX port coupled to the UMTS RX port. The ASM further comprises an antenna port; at least one GSM TX port; and at least one GSM RX port. A multi-port switch has respective ports coupled to the antenna port, the at least one GSM TX port, the at least one GSM RX port, and the common port of said UMTS duplexer. The common port of said duplexer has a reflection co-efficient at said connected multi-port switch port with a magnitude in the range 0.8 to 1.0 and with a phase, $\phi$, where $-210° \leq \phi n \times 360 \leq -150°$ where N is an integer.

9 Claims, 5 Drawing Sheets

DUAL MODE ANTENNA SWITCH MODULE

The present invention provides a dual mode antenna switch module (ASM) which may be used in cellular handsets, RF modules for cellular handsets and other communications systems.

In recent years there has been strong growth in the demand for cellular handsets which are capable of transmitting and receiving on multiple bands. For example, a number of different bands are available for worldwide implementations of the Global System for Mobile Communications (GSM), and cellular handsets can usually operate on at least two of these bands. Table 1 below lists four of the most common bands reserved for GSM handset operation.

TABLE 1

Some of the cellular systems on which GSM services are provided.

| Band | | TX Frequency Range/MHz | RX Frequency Range/MHz |
|---|---|---|---|
| AGSM | American GSM | 824-849 MHz | 869-894 MHz |
| EGSM | Extended GSM | 880-915 MHz | 925-960 MHz |
| DCS | Digital Cellular System | 1710-1785 MHz | 1805-1880 MHz |
| PCS | Personal Communications Services | 1850-1910 MHz | 1930-1990 MHz |

There has also been considerable growth in the demand cellular handsets which are capable of operating on one of the 3G systems in addition to being capable of operating on several of the GSM bands. The $3^{rd}$ Generation Partnership Project (3GPP) Technical Specification Group Radio Access Networks; UE Radio Transmission and Reception (FDD) TS 25.101 defines a number of bands of operation of the 3G system, of which the most popular is band I—see table 2 below. Band I of the 3G system in table 2 below is often referred to as Universal Mobile Telephone System (UMTS).

TABLE 2

Frequency bands of the 3G system.

| | TX Frequency Range/MHz | RX Frequency Range/MHz |
|---|---|---|
| Band I | 1920-1980 MHz | 2010-2070 MHz |
| Band II | 1850-1910 MHz | 1930-1990 MHz |
| Band III | 1710-1785 MHz | 1805-1880 MHz |

For GSM cellular systems, TX and RX signals are not processed by the handset simultaneously, therefore an electronic switching circuit is a suitable mechanism to interface the various TX and RX circuits of the handset with a single antenna. Similarly handsets which can operate on multiple GSM bands and/or one of the 3G bands, normally employ electronic switching circuits to select between the various bands of operation. Such switching circuits are typically referred to as Antenna Switch Modules (ASM). Examples of ASM capable of operating on a range of combinations of bands from table 1 and table 2 above, are disclosed in US20020090974A1 and EP1418680A1.

For UMTS, simultaneous TX and RX is required, and hence switching from TX to RX in the time domain is not possible. Since the UMTS TX and UMTS RX frequency ranges do not overlap, the UMTS TX and UMTS RX can be separated in the frequency domain.

A block diagram of a prior art dual mode ASM capable of operating on 4 GSM bands and 1 UMTS band is shown in FIG. 1. The module comprises an SP7T RF switch, and two low pass filters, LPF1, LPF2, and 7 input/output ports. The input/output ports of the ASM are as follows: an antenna port; 4 RX ports; two TX ports; and a single UMTS port. Two separate TX inputs are normally sufficient for the 4 GSM bands because AGSM TX and EGSM TX normally share a single power amplifier (PA) in the handset, and similarly because DCS TX and PCS TX also normally share a single PA in the handset. The UMTS TX and UMTS RX share a single port of the ASM and are separated externally to the ASM in the frequency domain as described above. The SP7T switch is typically a GaAs or pHEMT switch though recently CMOS multi-port switches have also become commercially available.

Frequency domain separation of the UMTS TX and UMTS RX signals at the UMTS port of the ASM of FIG. 1 can be effected using a duplexer such as that shown in FIG. 2. A duplexer is a 3 port device comprising a common port, a TX input and an RX output. A duplexer is designed to provide the following two conditions: TX signals at the TX input are passed without significant attenuation to the common port, and are isolated from the RX port; RX signals at the common port are passed without significant attenuation to the RX port, and are isolated from the TX port.

FIG. 3 shows the ASM of FIG. 1 with a duplexer, DPX, attached to the UMTS port. The duplexer separates the single UMTS port into a UMTS TX port and UMTS RX port. The type of duplexer which is most commonly employed in the ASM of FIG. 3 is a so called ceramic block duplexer, which comprises a pair of ceramic block filters, one with a passband which overlaps with the UMTS TX band, and another with a passband which overlaps with the UMTS RX passband. The duplexer could alternatively be a surface acoustic wave (SAW) duplexer which comprises a UMTS TX SAW filter, and a UMTS RX SAW filter. A further option for the UMTS duplexer of FIG. 3 is a bulk acoustic wave (BAW) duplexer which comprises a UMTS TX BAW filter, and a UMTS RX BAW filter. The latter BAW duplexer type is not widely available, due to the fact that BAW filters for RF applications are a relatively recently developed technology.

According to 3GPP, referred to above, for handsets operating at power class IV, the UMTS TX power level will be 21 dBm—see table 6.1 of section 6.2.1; also, according to 3GPP, table 5.0A of section 5.3, the separation between the active TX channel and the active RX channel for band I operation is 190 MHz. 3GPP also specifies that a 3G handset must be able to withstand a blocker signal at the antenna port with a power level of up to −15 dBm and with a frequency, f, where 1 MHz<f<2025 MHz and 2255 MHz<f<12,750 MHz—see table 7.7 of section 7.6.2.

Consider the case when the active TX channel of a 3G handset has a frequency of 1950 MHz and where a blocker signal with a frequency of 1760 MHz is applied to the antenna of the handset. If there is some non-linear device in the UMTS TX path of the handset, the UMTS TX signal can mix with the blocker signal to produce intermodulation (IM) products of $2^{nd}$, $3^{rd}$, $4^{th}$, $5^{th}$ order etc. Of particular concern for UMTS applications are $3^{rd}$ order intermodulation products; there are 4 separate $3^{rd}$ order IM products resulting from a TX signal at 1950 MHz and a blocker signal at 1760 MHz. The frequencies of these $3^{rd}$ order IM products are given by equations 1(a) and (b) below.

$$f_{IM3}=2\times1950+1760 \text{ and } f_{IM3}=2\times1950-1760 \qquad \text{1a}$$

$$f_{IM3}=2\times1760+1950 \text{ and } f_{IM3}=2\times1760-1950 \qquad \text{1b}$$

The $3^{rd}$ order IM product arising from the second term in equation 1a will have a frequency of 2140 MHz, which is at the centre of the UMTS RX band, and on the active RX channel of the handset in this case. Now consider the case where the circuit of FIG. 3 is employed in the 3G handset described above; the TX signal is applied to the UMTS TX port of the duplexer shown in FIG. 3 and the blocker signal is applied to the antenna port of the ASM of FIG. 3. Any non-linearity in the RF switch, will result in an IM product being generated at 2140 MHz, and this signal will pass without attenuation to the RX port of the duplexer. Since the IM product is on the active RX channel, the level of the IM product must be sufficiently low so that it does not affect the sensitivity of the UMTS receiver of the handset. According to 3GPP, the receiver sensitivity must be −106.7 dBm—see table 7.2 section 7.3.1. Thus the IM product at 2140 MHz should be −108 dBm or lower so as to have no effect on the receiver sensitivity.

Unfortunately, typical commercially available RF switches (such as pHEMT switches or CMOS switches) are not sufficiently linear. So, if a typical RF switch is employed in the circuit of FIG. 3, the $3^{rd}$ order IM product at 2140 MHz arising from a +21 dBm UMTS TX signal at 1950 MHz mixing with a −15 dBm blocker signal at 1760 MHz will have a power level significantly greater than −108 dBm.

The present invention provides a dual mode ASM as claimed in claim 1.

The ASM is configured such that the $3^{rd}$ order IM products at the UMTS RX port arising from a TX signal at the UMTS TX port in the range 1920 MHz to 1980 MHz, mixing with a blocker signal at the antenna port in the range 1730 MHz to 1790 MHz are minimized.

Preferred embodiments of the invention provide a highly linear response.

Embodiments of the invention will now be described, by way of example, with reference to the accompanying drawings, in which.

The embodiments of the invention which follow deal primarily dual mode cellular handsets with applications to GSM and 3G. However the invention is not limited to the embodiments described below.

Figures 1, 2:
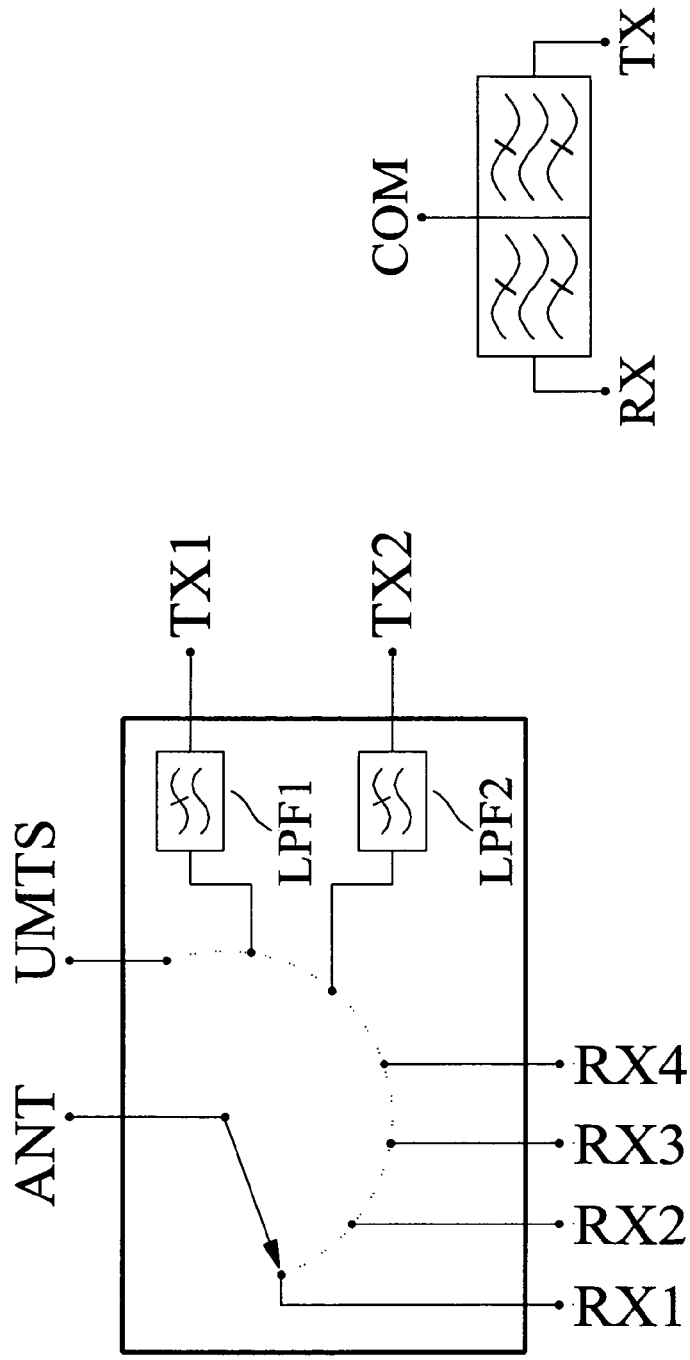
FIG. 1 shows a circuit schematic of a prior art dual-mode UMTS and quad-band GSM ASM.
FIG. 2 shows a prior art duplexer for frequency domain splitting of TX and RX.
Figure 3:
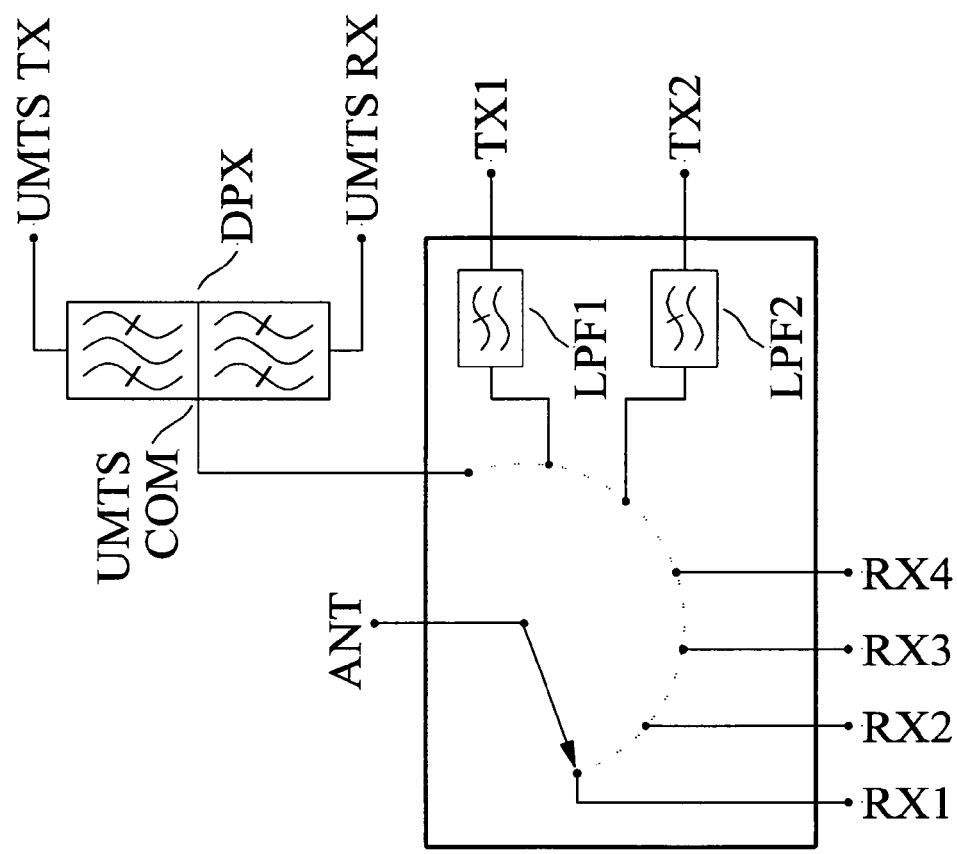
FIG. 3 shows a prior art quad-band GSM and UMTS antenna switch module including a duplexer for frequency domain splitting of UMTS TX and UMTS RX.
Figure 4:
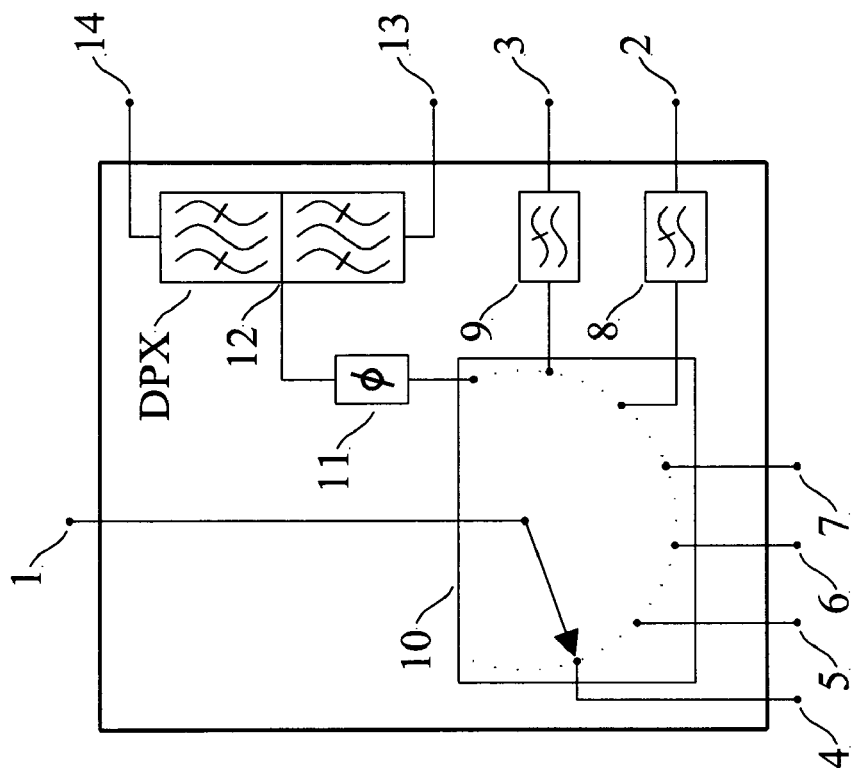
FIG. 4 shows a dual-mode (UMTS and quad-band GSM) ASM according to first embodiment of the present invention.

FIG. 4 shows a block diagram of a first preferred embodiment of an antenna switch module of the present invention. This circuit preferably comprises a common LTCC (low temperature co-fired ceramic) substrate including an antenna port, 1, a TX low band input, 2, a TX high band input, 3, RX outputs, 4, 5, 6, and 7, low pass filters, 8 and 9, an SP7T RF switch, 10, and a phase shifting network, 11. The circuit additionally comprises an on-board UMTS duplexer, DPX, comprising a common port, 12, a UMTS TX port, 13, and a UMTS RX port, 14.

The duplexer, 14, of FIG. 4 could be an off-the-shelf component, such as the ceramic block, SAW or BAW duplexers mentioned above. Alternatively, the duplexer 14 may comprise, a UMTS TX filter, and a UMTS RX filter, combined with a suitable branching circuit, where the two filters and the branching circuit are mounted inside the ASM of FIG. 4 and so that the combination of the two filters, and the branching circuit provides the required duplexing functions.

Due to the physical dimensions of typical commercially available ceramic block duplexers (particularly the maximum height), a SAW duplexer or BAW duplexer is to be preferred in cases where the ASM of FIG. 4 shares a common substrate.

The phase shifting network, 11, is placed between one of the terminals of the SP7T RF switch, 10, and the common port of the UMTS duplexer, 12. The function of phase shifting network, 11, is to adjust the phase of the reflection co-efficient at the common port of the UMTS duplexer, 12, at frequencies in the range 1730 MHz to 1790 MHz, so that the phase of the reflection co-efficient measured at the RF switch, 10, in the frequency range 1730 MHz to 1790 MHz will preferably be in the range from −150° to −210°.

For a typical UMTS duplexer, the magnitude of the reflection co-efficient at the common port of the duplexer, 12, over a frequency range from 1730 MHz to 1790 MHz is close to unity (since this frequency range is well outside both passbands of the duplexer). The phase of the reflection co-efficient at the common port of the duplexer, 12, over a frequency range from 1730 MHz to 1790 MHz will vary from one duplexer to another. The phase shifting network, 11, has the effect of rotating the phase of the reflection co-efficient in the frequency range 1730 MHz to 1790 MHz, so that it is close to −180 degrees when measured at the RF switch, 10. A reflection co-efficient with a magnitude of unity, and a phase of −180°, is that which results from a short circuit, and hence these two conditions ensure that the impedance to ground at the RF switch, 10, in the frequency range 1730 MHz to 1790 MHz will be low. The low impedance to ground at the RF switch in the frequency range 1730 MHz to 1790 MHz has the effect of minimising the generation of IM products due to mixing between a TX signal at the UMTS TX port, 13, and a blocker signal in the frequency range 1730 MHz to 1790 MHz at the antenna port, 1, in the RF switch.

Figure 5:
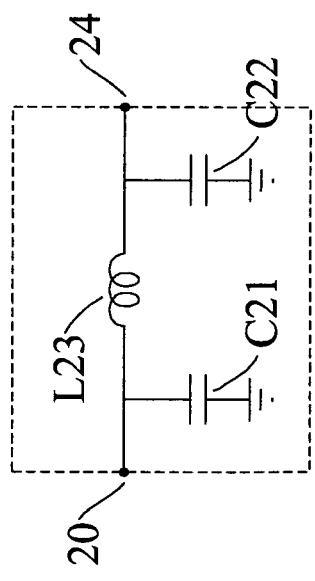
FIG. 5 shows a phase shifting network.

FIG. 5 shows an example of the phase shifting network, 11, in FIG. 4. The phase shifting network of FIG. 5 comprises an input port, 20, an output port 24, and a PI network comprising shunt capacitors, C21 and C22, and a series inductor, L23. The values of C21, C22 and L23 of the phase matching circuit are selected to have the following two effects: so that within a given passband, a 50 Ohm load at the input port, 20, will appear also as a 50 Ohm load at the output port, 24; to rotate the phase of the reflection co-efficient of a termination at the input port, 20, by a pre-determined angle θ, at frequencies within a given phase rotation band, where the magnitude of the reflection coefficient at the input port, 20, within the phase rotation band is close to unity (such as that arising from a short circuit or an open circuit).

For example, table 3 below gives the values of shunt capacitors, C21 and C22 and series inductor, L23, for a passband defined by the UMTS TX and UMTS RX bands combined, and where a phase rotation of 90° is required for a phase rotation band in the range 1730 MHz to 1790 MHz.

TABLE 3

Values of C21, C22, and L23 for matching at 2145 MHz and 90 degrees phase shift at 1760 MHz.

| Passband | Passband Frequency Range/ MHz | Passband Centre Frequency/ MHz | Phase Shift at 1760 MHz | C21/ pF | L23/ nH | C22/ pF |
| --- | --- | --- | --- | --- | --- | --- |
| UMTS TX + UMTS RX | 1920-2170 MHz | 2045 MHz | −90° | 0.755 | 3.055 | 0.755 |

Figure 6:
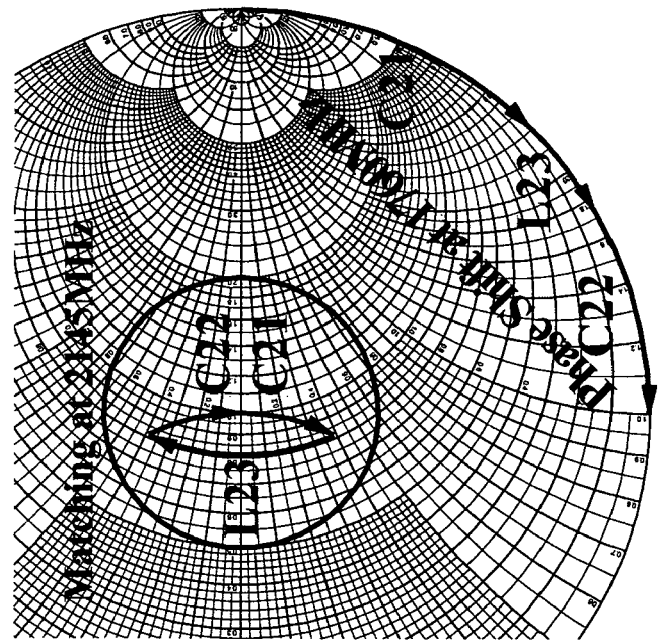
FIG. 6 shows phase shifting using the LC circuit of FIG. 5.

FIG. 6 shows graphically how the components C21, C22 and L23 in table 3 act on an impedance of 50 Ohms at the input, 20 of FIG. 4, so that it appears as an impedance of 50 Ohms at the output, 24, for a frequency of 2045 MHz. FIG. 6 also shows graphically how the same network of components rotates the phase of an open circuit (which has a reflection co-efficient of 1) at the input, 20, through an angle of −90° for a frequency of 1760 MHz.

Figure 7:
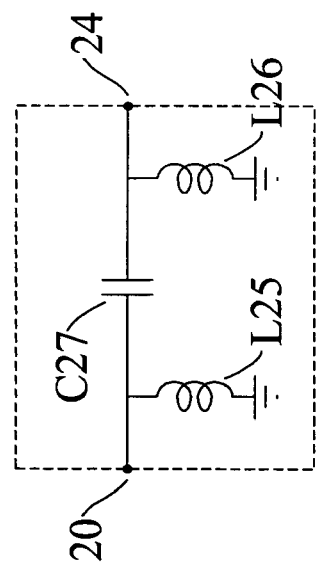
FIG. 7 shows an alternative phase shifting network to that of FIG. 5.

FIG. 7 shows an alternative phase shifting network to that of FIG. 5 above. The phase shifting network of FIG. 7 comprises an input port, 20, an output port 24, and a PI network comprising shunt inductors, L25 and L26, and a series capacitor, C27. As before, the values of L25, L26 and C27 of the phase matching circuit are selected so that within a given passband, a 50 Ohm load at the input port, 20, will appear also as a 50 Ohm load at the output port, 24; and so that within a given phase rotation band, the phase of the reflection co-efficient of a termination at the input port, 20, will be shifted by a pre-determined angle, θ, when measured at the output port, 24. The phase shifting network of FIG. 7 can be employed in cases where the pre-determined angle, θ, is required to have a positive value.

It should be noted that the phase shifting circuit could also be implemented by a number of further alternatives to those of FIG. 5 and FIG. 7 such as an LC TEE network comprising two series inductors and a shunt capacitor, or an LC TEE network comprising two series capacitors and a shunt inductor.

Figure 8:
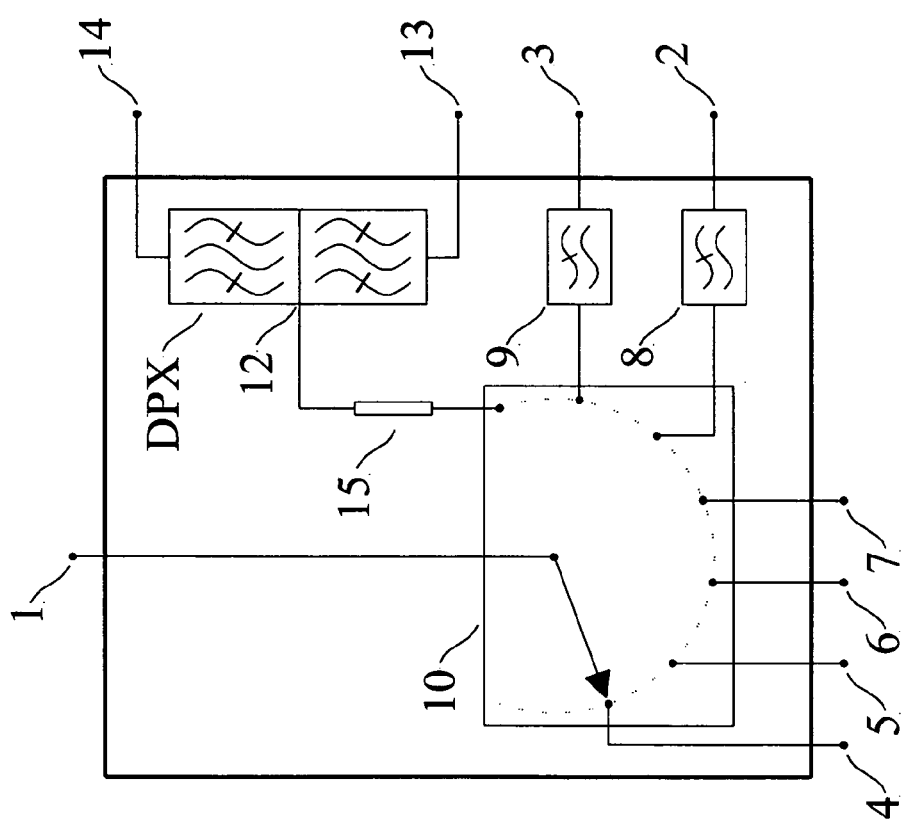
FIG. 8 shows a dual-mode (UMTS and quad-band GSM) ASM according to a second embodiment of the present invention.

FIG. 8 shows a block diagram of a second preferred embodiment of an antenna switch module of the present invention. As before, this circuit preferably comprises a common substrate including an antenna port, 1, a TX low band input, 2, a TX high band input, 3, RX outputs, 4, 5, 6, and 7, low pass filters, 8 and 9, an SP7T RF switch, 10, and a UMTS duplexer, DPX, comprising a common port, 12, a UMTS TX port, 13, and a UMTS RX port, 14. The circuit further comprises an electrical connection device, 15, which couples one of the terminals of the SP7T RF switch, 10, to the common port of the UMTS duplexer, 12. The electrical connection device, 15, can be a metalised track fabricated on a substrate, or a bond wire, or any means to electrically connect two devices together, or any combination of these means for electrical connection including LC networks mentioned above. The precise structure of the electrical connection device, 15, is chosen so that the phase of the reflection co-efficient at the common port of the UMTS duplexer, 12, measured at the RF switch, 10, in the frequency range 1730 MHz to 1790 MHz will be in the range from −150° to −210°.

It will be seen that the invention is advantageously implemented with the duplexer DPX and switch 10 on a common substrate enabling more controlled coupling of these devices to provide the required reflection co-efficient and phase shift at the operating frequencies of the ASM.

The invention claimed is:

1. A dual mode antenna switch module, ASM, comprising:
    a UMTS TX port;
    a UMTS RX port;
    a UMTS duplexer, comprising a common port, a TX port coupled to said UMTS TX port and an RX port coupled to said UMTS RX port;
    an antenna port;
    at least one GSM TX port;
    at least one GSM RX port; and
    a multi-port switch having respective ports coupled to said antenna port, said at least one GSM TX port, said at least one GSM RX port, and said common port of said UMTS duplexer,
    wherein the common port of said duplexer has a reflection co-efficient at said connected multi-port switch port with a magnitude in the range 0.8 to 1.0 and with a phase, φ, where $-210° \leq \phi + n \times 360 \leq -150°$ where n is an integer.

2. The ASM of claim 1, comprising a phase shifting circuit disposed between said common port of said duplexer and said connected multi-port switch port, which has the effect of adjusting the phase of the reflection co-efficient of said common port of said duplexer measured at said connected multi-port switch port.

3. The ASM of claim 2, where said phase shifting circuit comprises a PI network comprising a first shunt capacitor which is coupled to the input of said PI network, a series inductor which is coupled both to the input and to the output of said PI network, and a second shunt capacitor which is coupled to the output of said PI network.

4. The ASM of claim 2, where said phase shifting circuit comprises an LC network including at least one capacitor and at least one inductor.

5. The ASM of claim 4, wherein said LC network comprises one of an LC PI network or an LC TEE network.

6. The ASM of claim 2 where said phase shifting circuit is a metalised track of a given characteristic impedance.

7. The ASM of claim 2 where said phase shifting circuit comprises a bond wire.

8. The ASM of claim 2 where said phase shifting network comprises any combination of an LC network, metalised track or bond wire.

9. The ASM of claim 1 wherein each of said duplexer and said multi-port switch are fabricated on a common substrate.

* * * * *